US008218294B2

(12) United States Patent
Fretwell et al.

(10) Patent No.: US 8,218,294 B2
(45) Date of Patent: Jul. 10, 2012

(54) REMOVABLE SWITCHBOARD TRANSFORMER

(75) Inventors: Mitchell Dean Fretwell, Hopkins, SC (US); Hector Gabriel Dumaine, Col. Napoles (MX); Earl Dean Sandefur, Valley Park, MO (US)

(73) Assignee: Eaton Corporation, Cleveland, OH (US)

(*) Notice: Subject to any disclaimer, the term of this patent is extended or adjusted under 35 U.S.C. 154(b) by 122 days.

(21) Appl. No.: 12/661,540

(22) Filed: Mar. 17, 2010

(65) Prior Publication Data

US 2011/0228450 A1 Sep. 22, 2011

(51) Int. Cl.
*H02B 5/00* (2006.01)

(52) U.S. Cl. .......... 361/623; 361/606; 361/607; 174/50; 200/50.21

(58) Field of Classification Search .................. 361/600, 361/601, 605, 606, 608, 614, 620–623, 627–636, 361/640, 657, 663; 174/50, 51, 520; 200/50.01, 200/50.1, 50.21, 50.22, 50.23, 50.26, 50.12, 200/50.17, 50.4; 312/223.2, 223.3, 236, 312/249.4, 327, 11, 310, 334.25, 334.36
See application file for complete search history.

(56) References Cited

U.S. PATENT DOCUMENTS

| | | | | |
|---|---|---|---|---|
| 3,914,659 | A * | 10/1975 | May et al. | 361/607 |
| 5,450,280 | A * | 9/1995 | Wactor | 361/606 |
| 5,481,075 | A * | 1/1996 | Kleinecke et al. | 200/50.21 |
| 5,757,260 | A * | 5/1998 | Smith et al. | 337/186 |
| 6,563,048 | B2 * | 5/2003 | Holt et al. | 174/50 |

FOREIGN PATENT DOCUMENTS

| | | | |
|---|---|---|---|
| CA | CN201199480 | Y * | 2/2009 |
| JP | 403107313 | A * | 5/1991 |
| JP | 403270610 | A * | 12/1991 |
| JP | 406296311 | A * | 10/1994 |
| JP | 2001161010 | A * | 6/2001 |
| JP | 02007236074 | A * | 9/2007 |
| JP | 02008067422 | A * | 3/2008 |

* cited by examiner

*Primary Examiner* — Michail V Datskovskiy
(74) *Attorney, Agent, or Firm* — Jaquez & Associates; Martin J. Jaquez, Esq.; Alessandro Steinfl, Esq.

(57) ABSTRACT

A removable transformer system is described. The system comprises a switchboard structure, a removable transformer moveable into and out of the switchboard structure, and a transformer mounting and supporting assembly for supporting the removable transformer. During operation of the system, the removable transformer is horizontally displaceable along the supporting.

26 Claims, 3 Drawing Sheets

REMOVABLE SWITCHBOARD TRANSFORMER

FIELD

The present disclosure relates to moving systems for components. In particular, it relates to removable transformer systems and systems for displacements of transformers.

BACKGROUND

In industry today, as real-estate and construction costs increase, building owners strive to increase the amount of revenue generating floor space while subsequently decreasing the amount of non-revenue generating floor space. Electrical distribution equipment is typically located in electrical rooms. These electrical rooms usually have limited or restricted access which tends to make the floor space in these rooms non-revenue generating. As electrical room sizes decrease, it becomes difficult to remove or service electrical distribution equipment or components in those rooms without the use of large/heavy moving equipment.

SUMMARY

According to a first aspect, a removable transformer system is provided, comprising: a switchboard structure; a removable transformer adapted to be moved into and out of the switchboard structure; a sliding mechanism associated with the removable transformer, facilitating the sliding of the removable transformer as the removable transformer is moved into and out of the switchboard structure; and a transformer mounting and supporting assembly for supporting the removable transformer as the removable transformer is moved into and out of the switchboard structure.

According to a second aspect, a system for horizontal displacement of a transformer is provided, comprising: a switchboard structure; a sliding mechanism; and a transformer mounting and supporting assembly adapted to support the transformer to be displaced, wherein the sliding mechanism provides for sliding of the transformer into and out of the switchboard structure along the transformer mounting and supporting assembly during operation of the system.

According to a third aspect, a system for horizontal displacement of a device is provided, comprising: a structure; a sliding mechanism; and a device mounting and supporting assembly adapted to support the device to be displaced, wherein the sliding mechanism provides for sliding of the device into and out of the structure along the device mounting and supporting assembly during operation of the system.

Further embodiments of the disclosure are shown in the specification, drawings and claims of the present application.

DETAILED DESCRIPTION

In the present disclosure, a "switchboard" is defined (according to the National Electric Code) as a large single panel, frame or assembly of panels on which are mounted on the face, back, or both, switches, overcurrent, and other protective devices, buses, and instruments. Also in the present disclosure, a "transformer" is defined as a device that changes electrical energy from or isolates one electric circuit from or to another.

Figure 1:
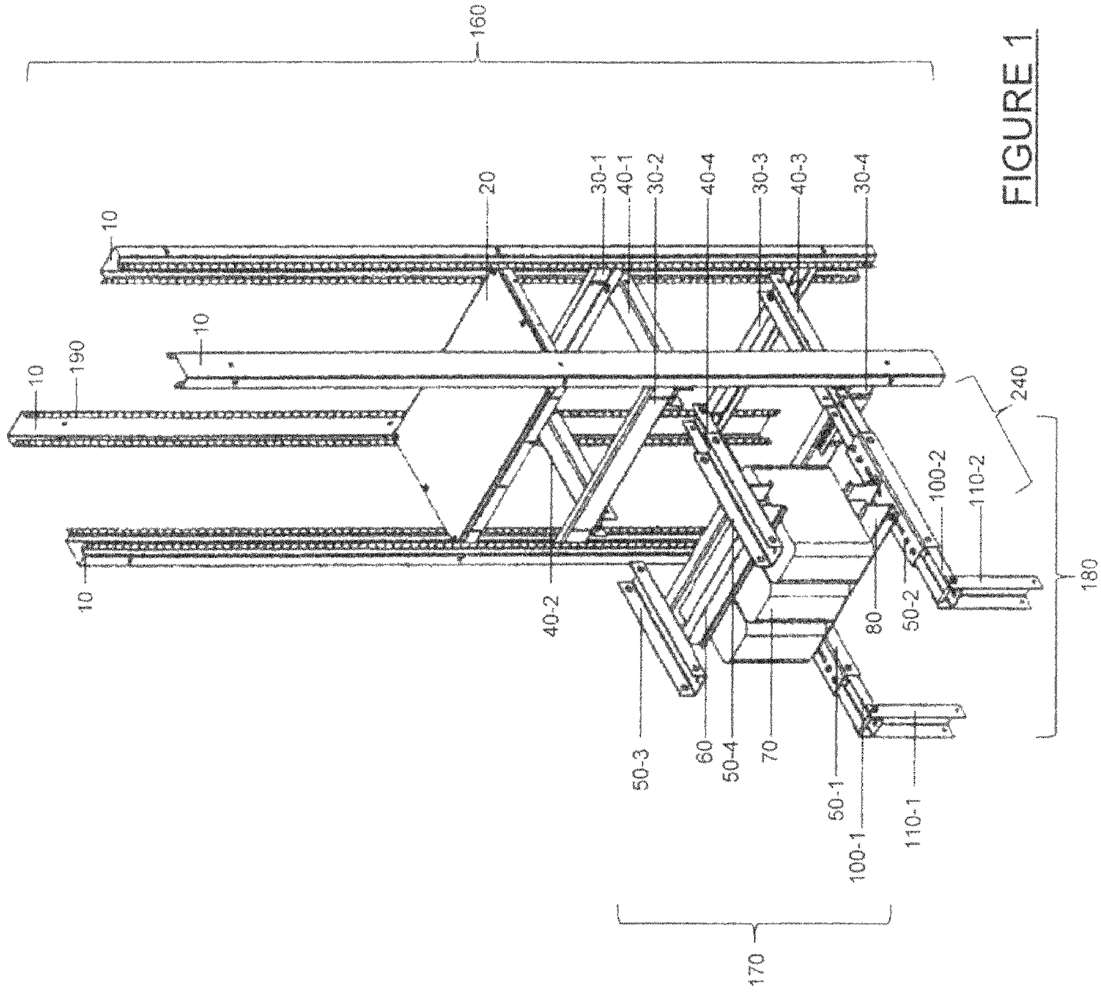
FIG. 1 is a perspective view of a switchboard's slide-out/removable transformer system or assembly.

FIG. 1 shows a perspective view of a switchboard's slide-out/removable transformer assembly according to an embodiment of the present disclosure. The switchboard's slide-out/removable transformer assembly comprises 1) a switchboard structure (160) for housing a removable transformer, 2) a distribution transformer (170) adapted to be moved into and out of the switchboard structure (160), 3) a transformer mounting and supporting assembly (180) for supporting the distribution transformer (170) as the distribution transformer (170) is moved into and out of the switchboard structure (160), and 4) a sliding mechanism (240) that allows for horizontal displacement of the distribution transformer (170) along the transformer mounting and supporting assembly (180). In the embodiment of FIG. 1, the switchboard structure (160) comprises four structure corner posts (10) and a transformer compartment barrier (20) with support brackets.

The switchboard structure (160) can further comprise four top support brackets and four bottom support brackets. In particular, the embodiment of FIG. 1 shows top support brackets (30-1, 30-2, 40-1, 40-2) and bottom support brackets (30-3, 30-4, 40-3, 40-4). For the present disclosure, "top" is defined as being above the surface of the transformer component (70), and "bottom" is defined as being below the surface of the transformer component (70). The structure corner posts (10) are provided with a plurality of holes or grooves (190) that allow a user to easily move the compartment barrier(s) (20), top support brackets (30-1, 30-2, 40-1, 40-2), and bottom support brackets (30-3, 30-4, 40-3, 40-4) up or down to accommodate a variety of different configurations. Further, the plurality of holes or grooves (190) may also allow for multiple distribution transformers (170) to be housed within any particular switchboard structure (160).

Figure 2:
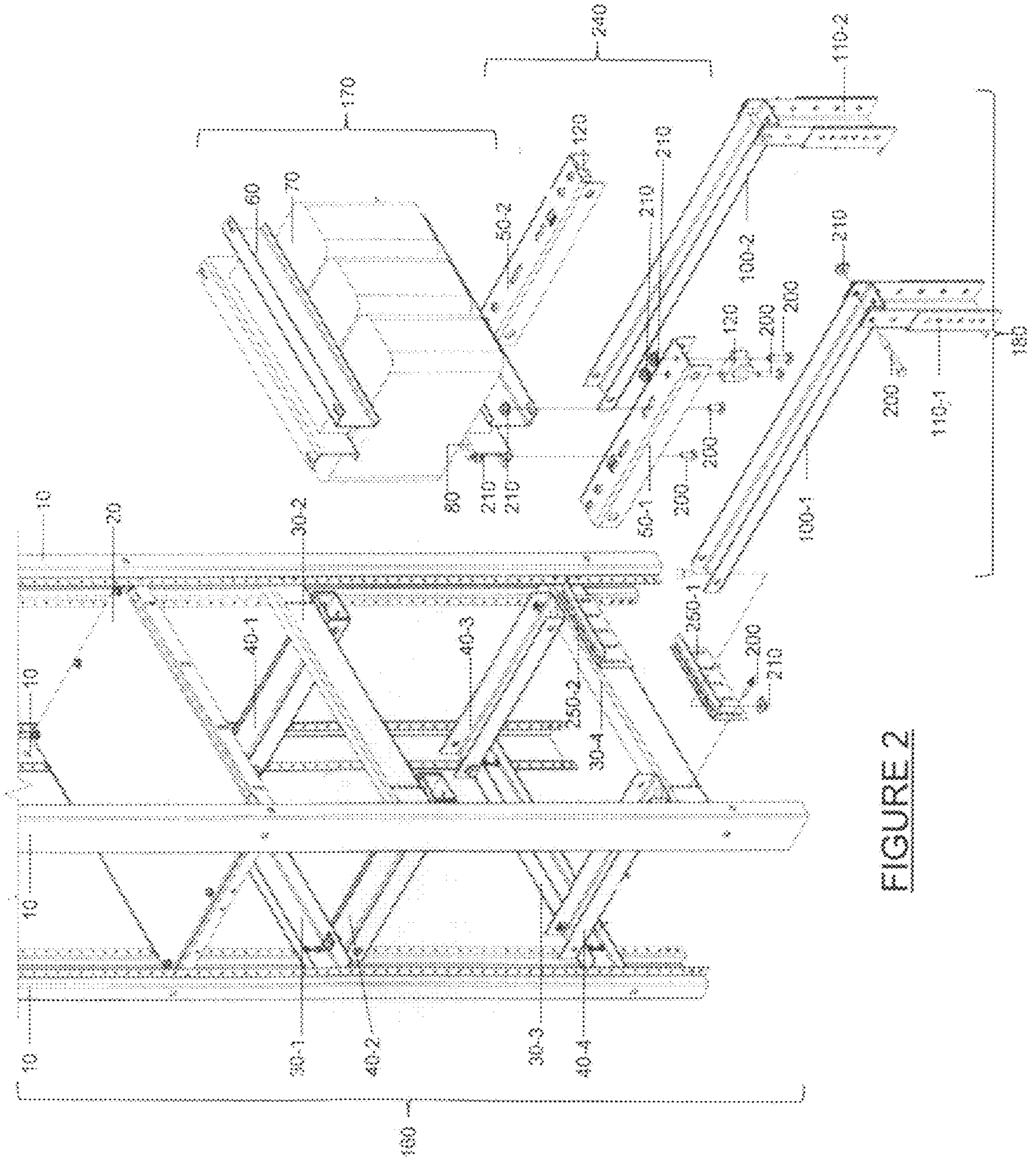
FIG. 2 is an exploded view of an Electrical Distribution Panel or Switchboard structure, a distribution transformer, and a transformer mounting and supporting assembly.

The sliding mechanism (240), shown in the embodiment of FIGS. 1 and 2, comprises a bottom set of U-channels (50-1, 50-2), a top set of U-channels (50-3, 50-4), and a plurality of roller mechanisms. The roller mechanisms are described in detail below and are pictured in FIG. 3. One or more roller mechanisms (120) are fastened to the bottom set of U-channels (50-1, 50-2).

The distribution transformer (170) is adapted to be moved into and out of the switchboard structure (160) and comprises a top assembly unit (60), a transformer component (70), and a bottom assembly unit (80). In the embodiment of FIG. 1, the transformer component (70) is attached to the bottom assembly unit (80) and the top assembly unit (60). The top assembly unit (60) is attached to a top set of U-channels (50-3, 50-4) of a sliding mechanism (240). The bottom assembly unit (80) is attached to a bottom set of U-channels (50-1, 50-2) of a sliding mechanism (240). FIG. 1 describes an embodiment of the present disclosure where both the top set and the bottom set comprise two U-channels. The skilled artisan, however, will recognize that a different number of U-channels can be provided. In one embodiment of the present disclosure, the U-channels (through the additional presence of roller mechanisms, later described in the present disclosure) allow the transformer to slide along the transformer mounting and supporting assembly during insertion and removal of the transformer within the switchboard structure.

In the embodiment of FIG. 1, the transformer mounting and supporting assembly (180) comprises a first rail component (100-1) and a second rail component (100-2) which are each attached at one end to the respective rail support brackets (250-1, 250-2), as further shown in FIG. 2. As also shown in FIG. 2, the rail support brackets (250-1, 250-2) are attached to the bottom support bracket (30-4) of the switchboard structure (160). Each rail component (100-1, 100-2) is attached at an opposing end to a rail component support member assemblies (110-1 and 110-2, respectively) such that the rail component support member assemblies (110-1, 110-2) may contact the floor or ground surface. One embodiment of the present disclosure utilizes a 90° angle of attachment between the rail component (100-1, 100-2) and the rail component support member (110-1, 110-2). In such embodiment, the rail components (100-1, 100-2) may run parallel to the floor or ground surface. The skilled artisan will recognize alternative methods for adapting the transformer mounting and supporting assembly (180) to contact the floor or ground surface. For example, adjustment to the rail height can be achieved by aligning different holes in the adjoining rail floor support members. Further, the skilled artisan may recognize the advantage of building a transformer mounting and supporting assembly (180) that is not level to the floor or ground surface.

FIG. 2 shows an exploded perspective view of the switchboard structure (160), the distribution transformer (170), the transformer mounting and supporting assembly (180), and the sliding mechanism (240). One embodiment of the present disclosure utilizes bolts (200) and nuts (210) to fasten the bottom set of U-channels (50-1, 50-2) to the bottom of the distribution transformer (170). FIG. 2 also shows a mechanism for fastening the transformer mounting and supporting assembly (180) to the switchboard structure (160). This mechanism, detailed in FIG. 2, comprises a set of brackets (250-1, 250-2), fastened with bolts (200), to attach the first rail component (100-1) and second rail component (100-2) of the transformer mounting and supporting assembly (180) to the switchboard structure (160). According to an embodiment of the present disclosure, the attachment of the brackets (250-1, 250-2) to the switchboard structure (160) may occur through self-tapping screws.

FIG. 2 also shows in detail the attachment of a rail component (100-1 or 100-2) to a rail component support member assemblies (110-1 or 110-2). The embodiment of FIG. 2 utilizes a rail component support member assembly (110-1 or 110-2) fastened perpendicular to the rail component (100-1 or 100-2) with one or more bolts (200) and nuts (210) per rail component (100-1 or 100-2).

Figure 3:
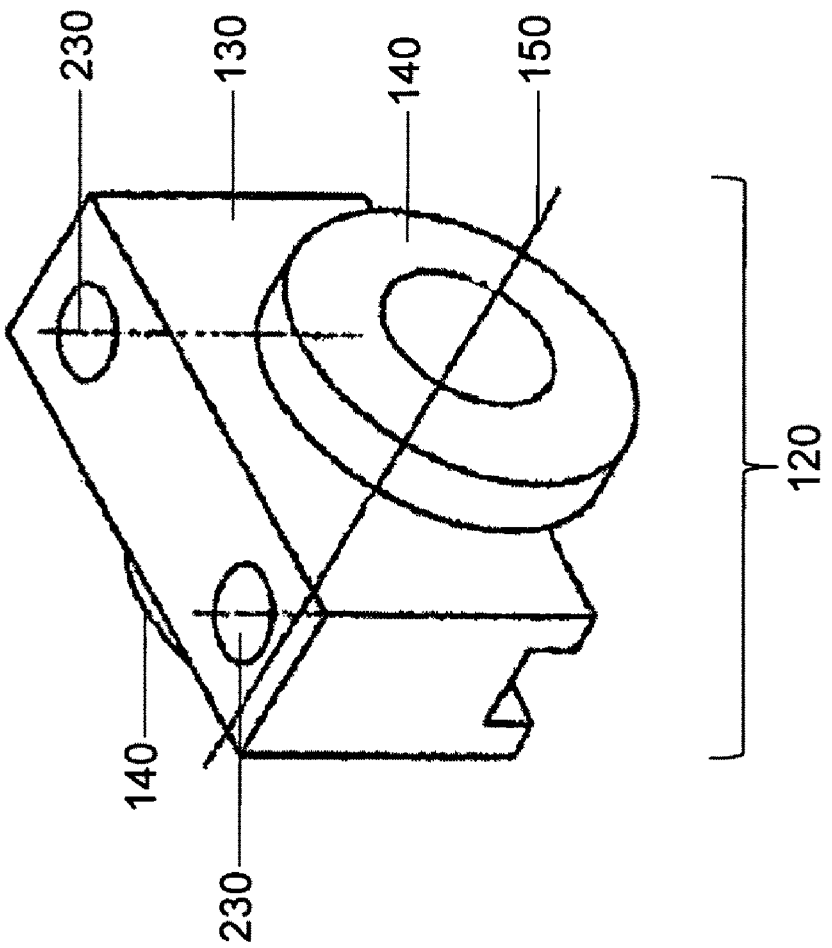
FIG. 3 is a perspective view of a roller mechanism to be used with the transformer mounting and supporting assembly of FIG. 2.

Another embodiment of the present disclosure relates to a mechanism of insertion and removal of the distribution transformer (170) within the switchboard structure (160). One or more roller mechanisms (120) (which are described in detail below; FIG. 3), are fastened to the bottom set of U-channels (50-1, 50-2) of the sliding mechanism (240) with one or more bolts (200) and nuts (210). One embodiment of the present disclosure thus utilizes a sliding mechanism (240) whereby the roller mechanisms (120), which are attached indirectly to the distribution transformer (170), allow the distribution transformer (170) to be rolled into and out of the switchboard structure (160) via the sliding mechanism (240) along the rail components (100-1, 100-2) of the transformer mounting and supporting assembly (180).

FIG. 3 shows a perspective view of one of the roller mechanisms (120). The roller mechanism (120) comprises a base unit (130), made of plastic, metal (e.g., aluminum), another material, or a combination of materials. The base unit (130) comprises two or more holes (230) for bolts (200) to be used for fastening the roller mechanism (120) to another member. The roller mechanism (120) further comprises two or more wheels (140) with an axle (150) connecting the wheels (140) to each other. According to an embodiment of the present disclosure, wheels (140) and axle (150) are milled out of a single piece of aluminum. A plastic insert collar (not shown) can be provided around the axle to allow sliding of the wheels against the axle. In one embodiment, the dimensions of the wheels (140) are chosen to allow the wheels (140) to contact a surface while simultaneously preventing the base unit (130) from contacting the same surface. A skilled artisan will appreciate that other configurations of the base unit (130) may be advantageous. For example, several sets of wheels (140) per base unit (130) can be provided for heavier applications. Consequently, one may wish to correspondingly adjust the length of the base unit (130).

In view of what is described above, one skilled in the art will understand that embodiments of the assembly thus far described comprise a switchboard structure (160), a distribution transformer (170), and a sliding mechanism (240) with a set of roller mechanisms (120) fastened to the distribution transformer (170) by way of a transformer mounting and supporting assembly (180). One embodiment of the present disclosure utilizes a sliding mechanism that allows the distribution transformer (170) to be rolled into the switchboard structure (160). One skilled in the art may find advantages in fastening the distribution transformer (170) within the switchboard structure (160) with a bolt (200) or other fastening means between the top set of U-channels (50-3, 50-4) and the top support brackets (30-1, 30-2, 40-1, 40-2). Alternatively, the top and bottom set of U-channels (50-1, 50-2), (50-3, 50-4), or just the bottom set of U-channels (50-3, 50-4) can be fastened to the distribution transformer (170) prior to sliding the assembly (170), (240) into the switchboard structure (160). In the same or similar embodiments, the distribution transformer (170) may be unfastened from the switchboard structure (160) and rolled out of the switchboard structure (160) along the rail components (100-1, 100-2) of the transformer mounting and supporting assembly (180) by way of the sliding mechanism (240).

A person having ordinary skill in the art will recognize other potential uses for the teachings of the present disclosure. For example, the distribution transformer (170) could be replaced with other electrical circuitry or mechanical members or devices if there would be advantages in mounting such circuits, members, or devices in a way that they can be rolled into or out of a structure like switchboard structure (160). According to several embodiments, the present disclosure will enable/assist removal and reinstallation of distribution transformers, installed in electrical distribution switchboard panels, without the use of large or heavy moving equipment.

What has been shown is a removable switchboard transformer. While the removable switchboard transformer has been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A removable transformer system, comprising a switchboard structure;

a removable transformer adapted to be moved into and out of the switchboard structure;

a sliding mechanism associated with the removable transformer and allowing sliding of the removable transformer as the removable transformer is moved into and out of the switchboard structure; and a transformer mounting and supporting assembly for supporting the removable transformer as the removable transformer is moved into and out of the switchboard structure, wherein:

the switchboard structure comprises a plurality of structure corner posts, top support brackets and bottom support brackets; and the top support brackets are adapted to be moved vertically depending on transformer or component size.

2. A removable transformer system, comprising a switchboard structure;

a removable transformer adapted to be moved into and out of the switchboard structure;

a sliding mechanism associated with the removable transformer and allowing sliding of the removable transformer as the removable transformer is moved into and out of the switchboard structure; and a transformer mounting and supporting assembly for supporting the removable transformer as the removable transformer is moved into and out of the switchboard structure, wherein the sliding mechanism comprises a bottom set of U-channels;

a top set of U-channels; and a plurality of roller mechanisms that interact with the bottom set of U-channels to allow the U-channels to slide horizontally.

3. The removable transformer system of claim 2, wherein the bottom set of U-channels comprises two U-channels.

4. The removable transformer system of claim 2, wherein the top set of U-channels comprises two U-channels.

5. The removable transformer system of claim 2, wherein one or more roller mechanisms are fastened to the bottom set of U-channels.

6. The removable transformer system of claim 2, wherein each roller mechanism of the plurality of roller mechanisms comprises a base unit;

a plurality of wheels; and an axle for connecting the wheels to each other.

7. The removable transformer system of claim 6, wherein the wheels and axle are a single unit.

8. The removable transformer system of claim 6, wherein the base unit is made of plastic or metal.

9. A removable transformer system, comprising a switchboard structure;

a removable transformer adapted to be moved into and out of the switchboard structure;

a sliding mechanism associated with the removable transformer and allowing sliding of the removable transformer as the removable transformer is moved into and out of the switchboard structure; and a transformer mounting and supporting assembly for supporting the removable transformer as the removable transformer is moved into and out of the switchboard structure, wherein the removable transformer comprises a transformer component, and the transformer component comprises a bottom assembly unit and a top assembly unit.

10. The removable transformer system of claim 9, wherein the bottom assembly unit is fastened to a bottom set of U-channels of the sliding mechanism.

11. The removable transformer system of claim 9, wherein the top assembly unit is fastened to a top set of U-channels of the sliding mechanism.

12. A removable transformer system, comprising a switchboard structure;

a removable transformer adapted to be moved into and out of the switchboard structure;

a sliding mechanism associated with the removable transformer and allowing sliding of the removable transformer as the removable transformer is moved into and out of the switchboard structure; and a transformer mounting and supporting assembly for supporting the removable transformer as the removable transformer is moved into and out of the switchboard structure, wherein:

the transformer mounting and supporting assembly comprises a plurality of rail components and a plurality of rail component support members; and a rail component of the plurality of rail components is fastened at its first end to a bottom support bracket of the switchboard structure and at its second end to a rail component support member assembly of the plurality of rail component support member assemblies.

13. The removable transformer system of claim 12, wherein the rail components of the plurality of rail components are arranged parallel to the floor or ground surface.

14. The removable transformer system of claim 12, wherein the rail components of the plurality of rail components are arranged not parallel to the floor or ground surface.

15. A system for horizontal displacement of a transformer, comprising a switchboard structure;

a sliding mechanism; and a transformer mounting and supporting assembly adapted to support the transformer to be displaced, wherein:

the sliding mechanism provides for sliding of the transformer into and out of the switchboard structure along the transformer mounting and supporting assembly during operation of the system; and the switchboard structure comprises a plurality of structure corner posts, top support brackets and bottom support brackets.

16. The system of claim 15, wherein the top support brackets are adapted to be moved vertically.

17. A system for horizontal displacement of a transformer, comprising a switchboard structure comprising a plurality of structure corner posts, the structure corner posts being provided with a plurality of holes or grooves;

a sliding mechanism; and a transformer mounting and supporting assembly adapted to support the transformer to be displaced, the sliding mechanism comprising:

a top set of U-channels;

a bottom set of U-channels; and a plurality of roller mechanisms that interact with the bottom set of U-channels to allow the U-channels to slide horizontally, the sliding mechanism providing for sliding of the transformer into and out of the switchboard structure along the transformer mounting and supporting assembly during operation of the system.

18. The system of claim 17, wherein one or more roller mechanisms of the plurality of roller mechanisms are fastened to the bottom set of U-channels.

19. The system of claim 17, wherein each roller mechanism of the plurality of roller mechanisms comprises a base unit;

a plurality of wheels; and an axle for connecting the wheels to each other.

20. The system of claim 19, wherein the wheels and axle are a single unit.

21. A system for horizontal displacement of a transformer, comprising a switchboard structure comprising a plurality of structure corner posts, the structure corner posts being provided with a plurality of holes or grooves;

a sliding mechanism; and a transformer mounting and supporting assembly adapted to support the transformer to be displaced, wherein:

the sliding mechanism provides for sliding of the transformer into and out of the switchboard structure along the transformer mounting and supporting assembly during operation of the system; and the transformer comprises a bottom assembly unit and a top assembly unit.

22. The system of claim 21, wherein the bottom assembly unit is fastened to a bottom set of U-channels of the sliding mechanism.

23. The system of claim 21, wherein the top assembly unit is fastened to a top set of U-channels of the sliding mechanism.

24. A system for horizontal displacement of a transformer, comprising a switchboard structure;

a sliding mechanism; and a transformer mounting and supporting assembly adapted to support the transformer to be displaced, wherein:

the sliding mechanism provides for sliding of the transformer into and out of the switchboard structure along the transformer mounting and supporting assembly during operation of the system;

the transformer mounting and supporting assembly comprises a plurality of rail components and a plurality of rail component support members connected with the plurality of rail components; and a rail component of the plurality of rail components is fastened at its first end to a bottom support bracket of the switchboard structure and at its second end to a rail component support member assembly of the plurality of rail component support member assemblies.

25. The system of claim 24, wherein the rail components of the plurality of rail components are arranged parallel to the floor or ground surface.

26. The system of claim 24, wherein the rail components of the plurality of rail components are arranged not parallel to the floor or ground surface.

* * * * *